June 13, 1967 J. J. HORAN 3,325,780

FLEXURAL TRANSDUCERS

Filed Oct. 21, 1965 11 Sheets-Sheet 1

June 13, 1967 J. J. HORAN 3,325,780

FLEXURAL TRANSDUCERS

Filed Oct. 21, 1965

11 Sheets-Sheet 5

June 13, 1967 J. J. HORAN 3,325,780

FLEXURAL TRANSDUCERS

Filed Oct. 21, 1965

11 Sheets-Sheet 6

June 13, 1967 J. J. HORAN 3,325,780

FLEXURAL TRANSDUCERS

Filed Oct. 21, 1965 11 Sheets-Sheet 7

June 13, 1967 J. J. HORAN 3,325,780

FLEXURAL TRANSDUCERS

Filed Oct. 21, 1965 11 Sheets-Sheet 10

June 13, 1967 J. J. HORAN 3,325,780

FLEXURAL TRANSDUCERS

Filed Oct. 21, 1965 11 Sheets-Sheet 11

United States Patent Office 3,325,780

Patented June 13, 1967

3,325,780

FLEXURAL TRANSDUCERS

John J. Horan, 420 Quigley Ave.,
Willow Grove, Pa. 19090

Filed Oct. 21, 1965, Ser. No. 500,432
31 Claims. (Cl. 340—10)

This invention relates to electroacoustic transducers employing ferroelectric ceramics. Such transducers, when intended for energy exchange in liquids, are far bigger and more costly than are the ceramic elements they contain, because they usually rely on heavy, complex, bulky, and expensive metallic structures to serve as housings, reinforcements, strongbacks, diaphragms, etc., for providing sealed, reflective air chambers behind the ceramic elements. The machining, assembly, and sealing operations often become very costly because of the precautions that must be taken to avoid any tensile stress concentrations in the brittle ceramic. Ironically, however, it is these very structures and their air chambers which actually impose extreme levels of steady-state stresses in ceramic elements (upon which the often-faint acoustic ripple must be superimposed) whenever it is necessary to take the transducers deep into the ocean. It is the necessity for spanning broad unsupported areas that imposes highly undesirable tensile stresses and the risk of catastrophic buckling on cylindrical elements and bilaminate windows, which constitute a predominate sonar population. If the risks could be lessened and stress levels could be kept down, greater sensitivities and higher efficiencies would result. Flooded cylinders and bilaminates seldom have yielded satisfactory performance, wasting the energy fed to them as projectors and bringing in extra noise and out-of-phase signal energy to spoil the directional sensitivity of hydrophones. It is believed that a better approach to the problem has been found. It is disclosed herein.

Among the objects of this invention are the following:

To disclose novel non-damped, frameless, transducer-element configurations;

To disclose new electroding, polarizing, and wiring arrangements;

To focus energy within the transducer element and to control the proportioning of motional impedance therein by means of self-mass-loading and inherent acoustic transformation;

To control energy transduction in turn by proportioning element impedance in such a manner that the best match within the immersion fluid exists in the optimum location on the element and in the desired orientation within the liquid medium;

To enhance the effect of designed-in impedance control by further decoupling or isolating high-impedance zones of the element from the environmental fluid and thus contributing further to efficiency and sensitivity;

To introduce novel selective decoupling means made of high-strength materials and capable of functioning under high environmental pressure;

To maximize the power-handling capability of sonar projectors, particularly at low frequency;

To eliminate all hazard of elastic instability and catastrophic collapse of transducers in service;

to create new transducers that actually become stronger when submerged because they have no contained chambers;

To create new transducers that are far more resistant to pressure depolarization than are conventional elements because it is virtually impossible to impose hydrostatic loads upon them at levels exceeding the environmental hydrostatic pressure;

To create new compact transducers having no need for conventional forms of ancillary metallic hardware.

To demonstrate a new philosophy in the mounting and support of ceramic transducer components, under which philosophy the element, rather than auxiliary metallic structure, becomes the principal structural member, while subjected, nevertheless, to lower stress levels than heretofore;

To provide sonar transducers whose patterns will be less affected by changes in operating depth than heretofore;

To apply the same new arts to the further creation of new dipole transducers, twin, in-phase transducers, tripolar, and multi-polar transducers which are capable of measuring the obliquity of acoustic pressure waves as a function of time of arrival at the several distinct acoustic termini of the elements ("velocity" transducers);

To improve directivity, efficiency, fluid coupling, submergence capability, power handling, sensitivity and low-frequency performance.

Other objects and novel features will become apparent in the balance of the specification, in the claims and in the drawings, in which:

Figure 1:
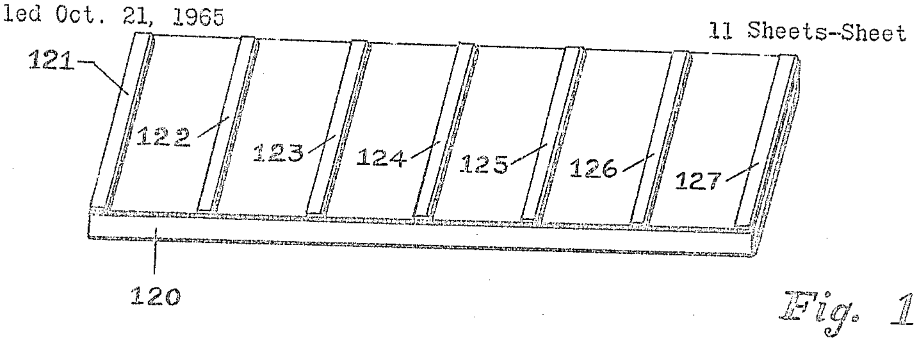
FIG. 1 is an oblique view of a flexurally-electroded, flag-shaped, free element of this invention.

Referring now to FIG. 1, the ceramic transducer element of this invention is seen in its simplest form 120, in which the silvered electrodes 121 through 127 have preferably been applied as a frit and fired in place on one side of the polycrystalline ferroelectric flag or slab 120. The ceramic body 120 is then polarized by applying an electric field of high intensity between alternate electrodes, the odd-numbered electrodes, for example, being held in parallel at negative or ground potential, while the full positive voltage is applied to the parallel-connected even-numbered electrodes.

One effect of polarization of a ferroelectric material is that a mechanical strain is locked into the ceramic body 120 by the applied electrostatic stress. Polarization induces a minute growth between the electrodes owing to the realignment of many of the unit-cell dipoles under the applied gradient. Now, when the electrodes have been applied to only one side of the ceramic, the undersurface 128 thereon having been left plain, the effect of polarization is non-uniform, being greatest in the material near the upper surface between the adjacent electrodes. The electric field extending from electrode to electrode blankets virtually all of the ceramic material, even on the far side where there are no electrodes. The lines of electric field strength, which are imaginary, of course, have contours resembling the imaginary lines of magnetic field force conventionally drawn for illustration between the adjacent salient poles of a magnet.

Figure 2:
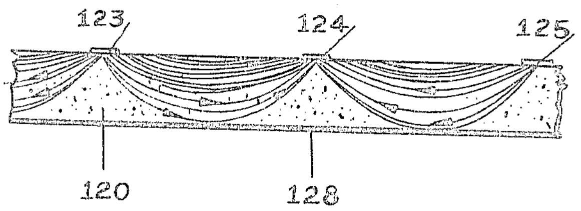
FIG. 2 is a schematic view of an enlarged portion of the element of FIG. 1.

Thus, to understand better what happens under the polarizing electric field, one may visualize the gradients as shown in FIG. 2, where we see a sample of the material adjacent electrodes 123, 124, 125 in cross section somewhat enlarged, It is apparent that along the upper surface the stretching effect is at a maximum. As we approach the bottom surface 128, the intensity of the field, as evidenced by the line spacing, becomes lessened and the directions of the gradient lines are no longer straight lines but loops.

Now, the less the field intensity at any spot, the less will be the percentage of domains realigned to coincide with the field and stretched physically parallel thereto. Moreover, when the gradients describe paths other than straight lines, their stressing effect on the domains will follow their curved paths.

It is well known that the linear elongation of the distance between electrodes in a polarized ceramic is accompanied by a foreshortening in both directions perpendicular thereto. This foreshortening complies with Poisson's ratio, approximately 0.3 for many materials including ceramic ferroelectrics.

Now, since the weaker fields approaching the far side 128 are generally at fairly large angles with respect to the fields along the electroded surface of the slab, it becomes quite apparent that there will be comparatively little net elongation along the lower surface 128 under the electric field.

A beam which is unequally stressed, or stressed in opposite directions, along its two opposite extreme surfaces will be cambered or bowed. If the stress pattern is reversed, the beam will bow in the opposite direction.

When the external polarizing field is removed from a ferroelectric ceramic, the free charge soon leaks off. The field relaxes and the ceramic relaxes dimensionally also, but it retains some locked-in polarization and camber. This polarization could be removed if we were now to apply an electric field of opposite sign and of sufficient intensity to destroy this remanent alignment, just as a reversed magnetic field of sufficient intensity would affect a so-called "permanent" magnet. If we should go on and apply a reversed field equal in magnitude to the first field, our ceramic will receive a reversed polarization, but its physical distortion will be in the same direction and have the same value as it did under the first field. The pattern of polarization, relaxation, and reversal of polarization is quite analogous to the B–H or "hysteresis" curve with which the magnetic properties of materials are commonly described.

As with magnetic fields in magnetic materials, we may, with discretion, apply reversed electric fields lacking sufficient intensity to impair the polarization permanently. While such a lesser field exists, the polarized-in deformation or camber of element 120 is reduced, and when it is removed, the ceramic recovers the camber that it was left with after polarization, neglecting ageing and other minor phenomena.

If we apply an alternating voltage lacking sufficient magnitude to damage the remanent polarization during the reversed half cycles, we can make the flag-shaped element 120 wave or flex with each cycle. If the frequency of our alternating voltage coincides with the natural frequency of flexure of the flag or beam 120, it will resonate at that frequency. As a sound projector it will be most efficient at its resonant frequency, but it can be "brute-forced" at other frequencies. At this same resonant frequency, its sensitivity as a hydrophone will be enhanced over its sensitivity at other frequencies.

The radiation pattern of the flexural flag transducer comprises six principal lobes, three on each of the opposed faces. Of the three lobes on one side, the two end lobes will be in phase but the middle one will be out of phase with them; the lobe origins being separated at the nodes. It is possible to change the positions of the nodes, that is, to move them toward the ends of the element 120 by clamping or mass loading the element there, in which case more of the energy will be radiated from the middle lobe; or one may clamp the element at the mid-point, causing the middle lobe to disappear and shifting all radiation to the end lobes. Mass-loading at the mid-point, distributed as shown by dotted lines in FIG. 3, is another way of favoring radiation from the ends.

In FIGS. 1 and 2, and again repeatedly through this specification, it is seen that the use of bilaminates is no longer a prerequisite for flexure. Because no metallic holder is needed, these elements will generally have lower resonance frequencies than do most bilaminates of the prior art. Size ranges here are unlimited and there is no need for grinding, lapping, etc. The risks of breakage encountered with bilaminates and their high costs can be forgotten.

Figure 3:
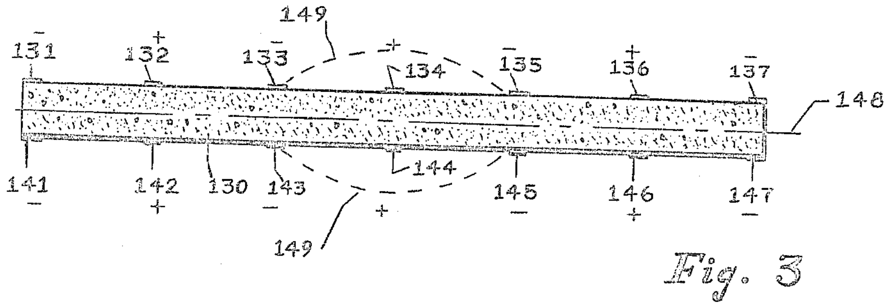
FIG. 3 is an edge view of a second flexurally-electroded, flag-shaped, free element of this invention, showing the position of the shear plane.

Now, referring to FIG. 3, there is seen a cross section of a similar flag or slab 130, which is preferably somewhat thicker than the element 120 of FIGS. 1 and 2. The electrodes in FIG. 3 are again exaggerated in apparent height, these coatings being preferably of fired-on silver and very thin.

Electrodes 131 through 137 of slab element 130 are again electroded and polarized exactly as were those in the prior figures, electrodes 141 through 147 also being similarly applied and polarized simultaneously. For illustration, all odd-numbered electrodes are shown assigned negative or ground potential; and the even-numbered ones receive maximum positive polarizing potential. Following the polarization, connections are changed in part, electrodes 131, 133, 135, 137, 142, 144 and 146 now being wired to one lead, while the remaining electrodes, also in parallel with each other, are connected to the opposite lead. When element 130 is to serve as a projector, the paired leads may be coupled across the output of a single-phase alternator; when it is a hydrophone, the leads will carry the signal into the amplifier.

Now, whenever the alternating voltage gradient applied to the upper side of element 130, serving as a projector, is instantaneously in the same direction as was the polarizing field, the upper side will tend to be elongated. But the lower side, receiving operating potentials in opposite directions between its electrodes, will tend to be foreshortened as the upper surface elongates. As the current reverses during the next half cycle, so do the dimensional changes, and the slab will bend in the opposite direction.

Thus, again we have a flexing element, issuing energy from its opposite faces as described for prior element 120, and controllable in the same manner. Certain precautions are desirable. Although operating potentials are always less than polarizing potentials, the operating potential in this case must be so low that it will not break down or impair polarization of the material across its thickness, as between electrodes 131, 141, 134 and 144, etc. Moreover, the applied potential must not excite these elements in general into excessive deflections that may fracture them, this being a particular hazard when they are not sufficiently loaded and when excited near the resonant frequency.

Element 130 has a neutral plane 148 of zero longitudinal stress, which defines the demarcation between that material that is being compressed on one side and the material that is being elongated on the other during any half cycle of flexure or bowing thereof, the kind of stress alternating in each element half with each new half cycle of impressed electrical or acoustic potential or pressure.

Figure 4:
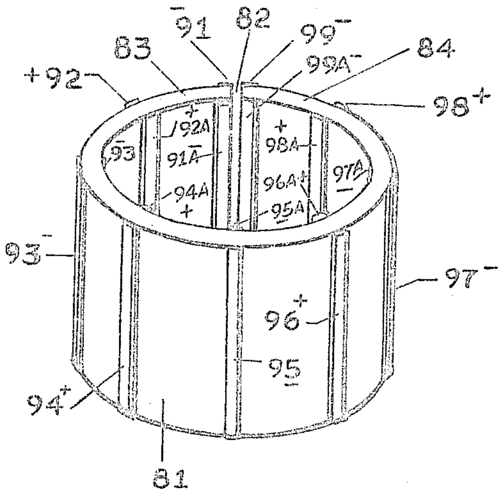
FIG. 4 is a pictorial view of a flexurally-electroded curved form of ferroelectric transducer element of this invention.

Referring now to FIGS. 4 through 7 and particularly to FIG. 4, element 81 therein is similar to element 130 of FIG. 2, except that it has been made in curved form, as shown. There is a gap 82 between the ends 83, 84. Nine pairs of electrodes are shown about 40° apart around both the outer circumference and the inner one. Normally the angular spacing would be closer for more efficient polarization; but the quantity of electrodes is not significant to the invention and will generally vary directly with the peripheral measurement and inversely with the maximum voltage available in the polarizing equipment. Reading counter-clockwise from slot 82, outer electrodes 91 through 99 and the corresponding inner electrodes 91A through 99A are encountered. These are preferably extremely thin and fairly narrow coatings of silver-glass frit, well known in the art and quite receptive to soldering of wires thereto.

Figure 5:
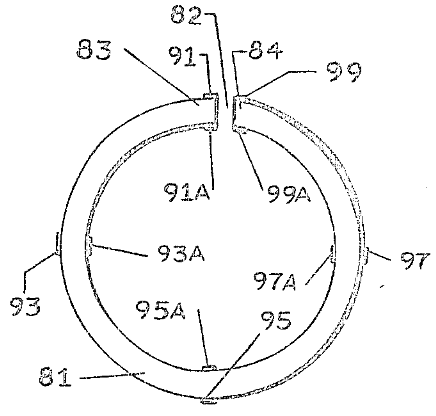
FIG. 5 is a sketch identifying electrodes of the element of FIG. 4 which are given the same polarity in the polarizing operation.

FIG. 5 is a schematic end layout identifying these electrodes of element 81 of FIG. 4 which will be held at one polarity, say negative, during polarizing. Normally they would be temporarily interconnected by a soldered-on wire header at one end, and the remainder of the electrodes would be similarly tied together by a separate wire header at the other end in preparation for the application of high polarizing voltage. After polarizing, however, temporary wiring is then removed and replaced by the permanent electroding scheme demonstrated in FIG. 6, wherein all of the odd-numbered electrodes on the exterior circumference and the even-numbered electrodes on the inner circumference are linked together by electrical header 86 at one end. The alternate electrodes would be interconnected to the other header 87 hidden from view at the opposite end. Both headers are preferably, but not always necessarily, insulated from contact with the ceramic material, and, of course, they are never allowed to become short-circuited. The rearrangement of electrode connections after polarization is seen to be similar to that previously described in the specification in connection with FIG. 3 for a flag-shaped element.

Figure 6:
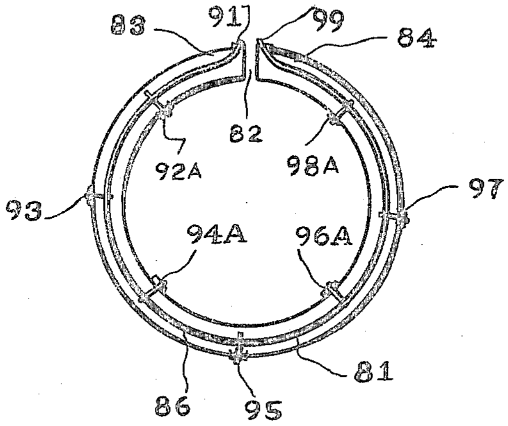
FIG. 6 is a schematic showing one side of the final wiring array for the element of FIG. 4.
Figure 7:
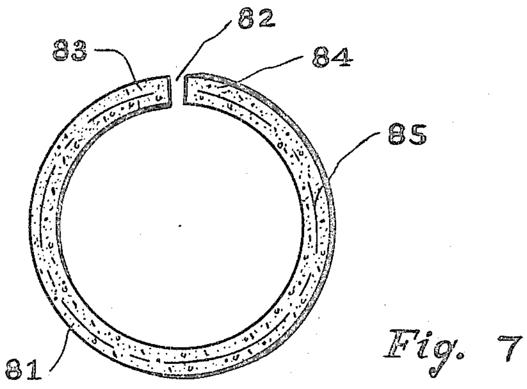
FIG. 7 is a cross section of the element of FIG. 6, illustrating the concept of the shear circle.

The element geometry has again been applied to advantage in FIG. 6. During the half cycle of operating voltage that brings negative potential to the odd-numbered external electrodes 91, 93, 95, etc., which received a positive polarization signature, the material lying between them and the respective even-numbered electrodes on the same external circumference 92, 94, 96, etc., will obviously stretch. The same half cycle, however, brings negative potential to the even-numbered internal electrodes 92A, 94A, 96A, etc., and positive potential to the odd-numbered internal electrodes 91A, 93A, 95A, etc., causing the material along the inner surface to shrink. During this half cycle, therefore, element 81 undergoes physical strain of opposite signatures along its outer and inner skins.

During the following half cycle, when the impressed voltage reverses in polarity, the outer skin now shrinks, while the material along the inner circumference becomes minutely longer. Since the outer and inner skins oscillate oppositely as to length, the region lying about midway between them is relatively unaffected. The demarcation occurs along line 85, seen in FIG. 7, herein termed the shear circle, which is analogous to the neutral plane in a straight beam. The shear circle 85 is the curved locus of zero longitudinal compressive or tensile stress in the face of whatever uniform mechanical, acoustical, or electrical stress may be imposed upon element 81, including inertial clamping stress, but not including locally applied influences. It may be assumed that the electrodes do not ordinarily behave as local stress raisers of critical magnitude. Cylindrically shaped element 81 flexes cyclically exactly as does a vibrating beam, because the incoming electrical energy cyclically stresses the material in opposite directions on opposite sides of the curved "neutral plane" or shear circle 85. However, when it is serving as a projector, it is subject to overstressing and shattering in the range of resonance by voltages well below the depolarizing value, particularly if the element is not loaded by immersion in an energy-absorbing fluid. Also the cylinder must not be so thin-walled that the operating voltage, which now appears across the thickness of the element, produces cyclical repolarization or electrical breakdown in that direction.

Figure 8:
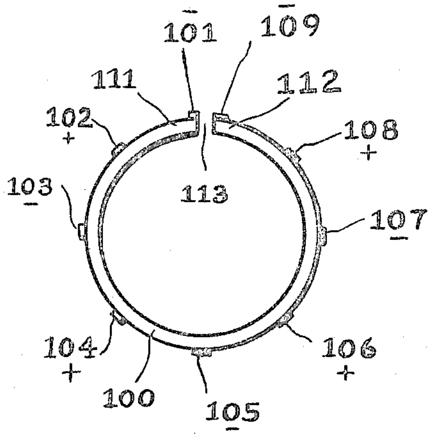
FIG. 8 is an end view of an element having a different polarizing and wiring array.
Figure 9:
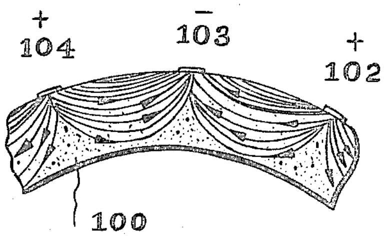
FIG. 9 is a schematic enlargement of a portion of the element of FIG. 8.

Referring now to FIGS. 8 and 9, there is shown a second form of curved beam (or slotted cylinder) 100, with ends 111 and 112 and slot 110. It is portrayed with 9 outer electrodes; but there are none on the inward surface. Optionally, the electrodes might have been applied on the interior surface rather than outside. A segment of an element like 100, containing only electrodes 162, 163 and 164, appears enlarged in FIG. 9. By comparison of FIG. 9 with FIG. 2, we see that the behavior of element 100 will resemble that of prior element 120, just as we saw previously that element 81 of FIGS. 4 through 7 behaved like element 130 of FIG. 3. In fact all four elements have much in common.

Generally speaking, the practice of electroding one side only would be followed principally where cost savings or very small size is of paramount importance.

Figures 10, 11:
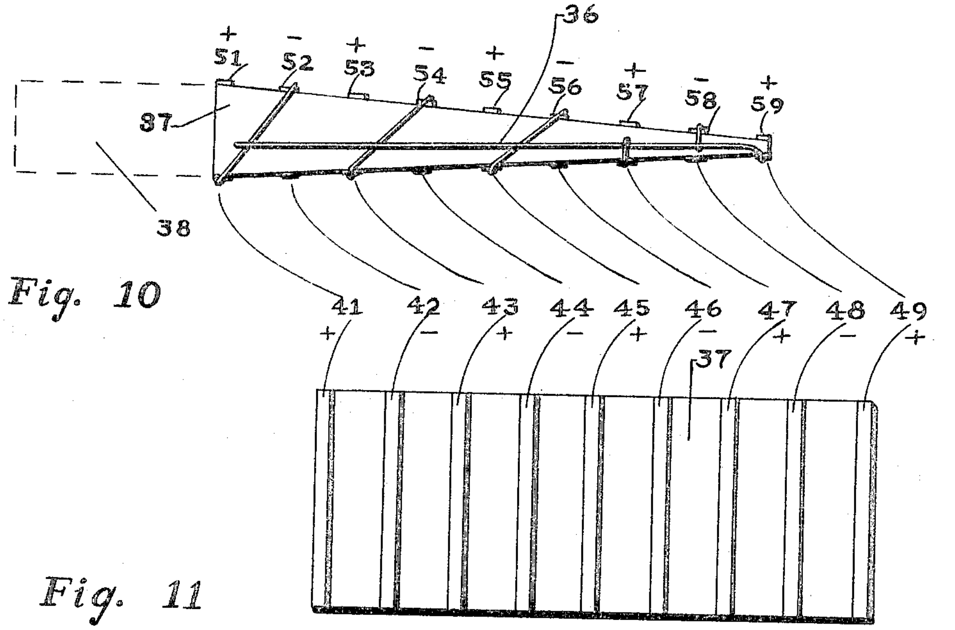
FIG. 10 is an edge view of a proportioned-impedance transducer element of this invention.
FIG. 11 is a view at a right angle to FIG. 10, prior to wiring the element.

Referring now to FIGS. 10 and 11, there is seen an edge view of a desirably tapered element 37 and a face view at right angles thereto, no wiring being shown on the face view. Both sides of the element being similar, half of the 18 electrodes are arrayed on each side. Transducer elements of this type are normally enrobed in an insulating elastomer; however they may be left bare, as shown, for clarity of presentation, when they are to be contained in an electrically insulating, acoustically transmitting fluid such as caster oil. Thus, the views do not require enrobement for function.

During the polarizing operation, the polarity assigned to each of the electrodes 41 through 49 below and 51 through 59 may be as shown, where in the odd-numbered stripe electrodes on each side are positive and the alternating even-numbered stripes are negative. This arrangement, as compared with other possible methods of exciting flexure, gives tapered elements a practical degree of protection against variability of polarizing-voltage gradients that can destroy elements in the polarizing operation, without requiring different voltages to be applied between each pair of electrodes. The arrangement shown also permits application of the best and simplest pattern for permanently wiring the transducer after polarizing for optimum service. Sometimes it may be desirable to use slightly higher voltages between electrodes at the thick end, to hold the voltage for a longer period, or to crowd electrodes a little closer, in order to improve the polarization deep within the element.

Alternate electrodes on opposite sides have been solder connected across the top edge of the element by the header network 36 in FIG. 10. Connections are thus made to stripes which were originally assigned opposite polarizing potential. At the opposite end of the element 37, not seen, those stripes not connected to header 36 are connected to a similar header 36A. Headers 36, 36A are preferably separated from direct contact with the element by thin coatings of a good insulating material such as an epoxy applied either directly on the header and its interconnecting wires or applied across the edges of the element 37 under the headers 36, 36A. Thereafter, the headers and interconnecting wires may be pushed snug against the coating and the entire element enrobed with an elastomeric coating which, incidentally, affords protection to the wiring as well as insulates the entire element assembly.

Element 37 serves best at its lowest resonant mode, in which the slender tip portion enjoys the greatest transverse amplitude. Maximum power will be radiated from the tip into a low impedance fluid in a pair of oppositely radiated lobes perpendicular to the planes of the faces at the tips. The fact that the bulk of the ferroelectric material is located at the thick end operates not only to focus the energy and help drive the tip into high flexural amplitude, but also to mass-load the thick end in such a manner that, in the fundamental mode, there is a shift of the nodal point to the thick end, causing the element to behave as though it is substantially clamped at that end, where the motional impedance, measured at the skin, reaches a maximum, so that there will actually be substantially little delivery of energy there to the low-impedance medium in which the transducer is immersed.

The tendency of the element of FIGS. 10 and 11 to become displaced rotatively as it flexes is overcome if it bonded or otherwise coupled to other structure 38 at the heavy end, as shown by the dotted line.

Elements such as 37 of FIGS. 10 and 11, as well as that which follows, will resonate generally at higher frequencies than those which have preceeded them hereinbefore because their heavy portions impart greater stiffness.

Figure 12:
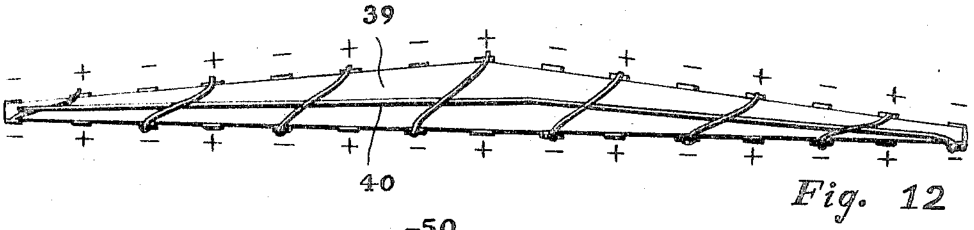
FIG. 12 is an edge view of a second form of proportioned-impedance element of this invention.
Figure 13:
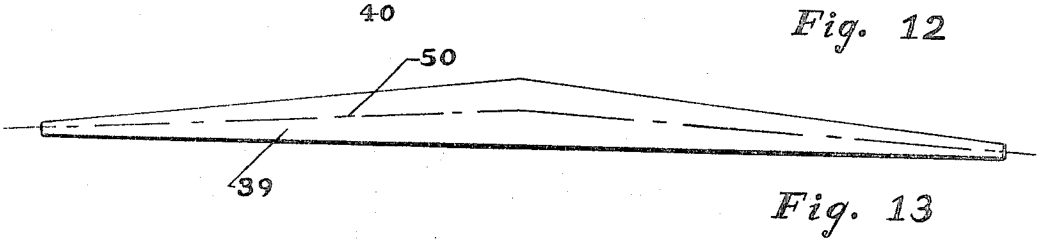
FIG. 13 is an edge view, less electrodes and wiring, but showing the relative position of the shear plane of the element of FIG. 12.

Referring now to FIGS. 12 and 13, there is seen a double-ended wedge-shaped element 39 having a plurality of electrodes of alternating remanent polarization like those in FIG. 10 and equipped with a header 40 at one end and a second header (here unseen) at the other end. As in FIGS. 10 and 11, the final wiring arrangement ties together all electrodes of one polarity along one side with all those of the opposite polarity on the other. Thus, an impressed voltage of one polarity will have a stretching effect on one side of the shear or neutral plane 50 in FIG. 13 and a shrinking effect on the other. These opposed effects flex the transducer element, which is actually a vibrating flexural beam.

If the element were not self-mass loaded by the heavy middle section, it would select very obvious nodal points between its mid-point and the tips. If the beam is so heavily mass-loaded that it behaves more or less like a beam having its mass at the center, the mid-point will behave as the single node and the acoustic impedance will be very high in this area. The transverse oscillatory excursion at resonance will increase from virtually zero at the mid-point to maxima at the tips. Since the fluid has a uniformly low impedance, the power delivered by the ferroelectric beam increases to a maximum near the tips, a fact that may seem surprising to some in view of the fact that the beam is most slender there.

The effect of water load modifies the behavior somewhat, but, in general, there will be high-amplitude sound-pattern lobes issuing perpendicular to the surfaces at the tips, with considerably less radiation from the stiff, high-impedance middle portion. When the element is used as a hydrophone instead of a projector, its sensitivity pattern will be similar to its radiation pattern. When electroded as shown, the ends will move in phase and the element is balanced against rotation. By dividing the electrodes into separate sets for each end, the ends may be driven out of phase, and, if they are driven 180° out of phase, the element becomes a true dipole, like that element 60 to be seen in FIG. 16.

Figure 14:
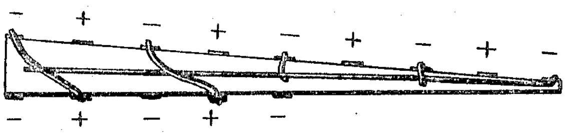
FIG. 14 is an edge view of a third form of proportioned-impedance element in accordance with this invention.
Figure 15:
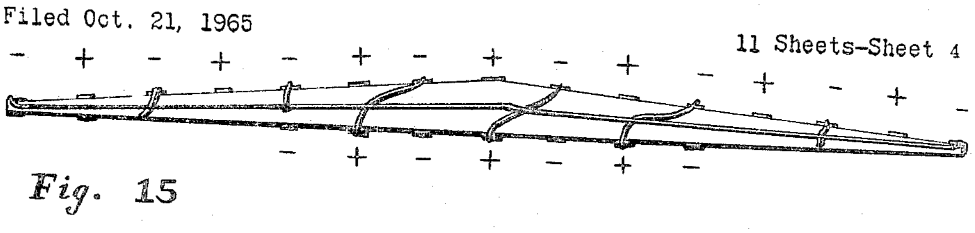
FIG. 15 is an edge view of a fourth form of proportioned-impedance element in acordance with this invention.

Referring now to FIGS. 14 and 15, there are shown single-ended and double-ended elements with electrode layouts in which the initial polarization is, as in prior figures, indicated opposite each electrode. Those electrodes which are visible in the drawing are again interconnected so as to produce opposite responses on opposite sides and thus to flex the element.

Figure 16:
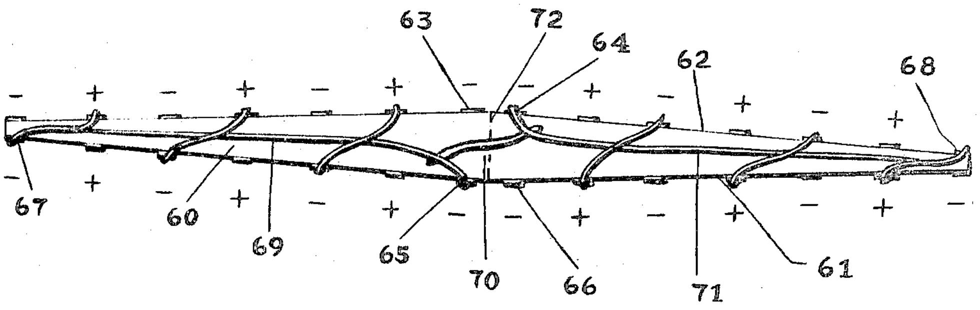
FIG. 16 is an edge view of a fifth form of proportioned-impedance element of this invention.

A few of the electrodes close to the tips, all of them from one side of each element, appear to have been omitted. The omission tends to broaden the low-impedance zones of the element. It is sometimes desirable when the tip is so thin that there is danger of voltage breakdown across the element when it is serving as a projector or where a clutter of wires may be undesirable near the tips. As in the prior figures, the electrodes that are not connected to the visible header are connected in common to a second header that is preferably located at the hidden edge. Some caution is necessary; the tips must not be made so slender as to increase the risk of fracture of the very brittle ceramic owing to the heightened effect of scratches, pits, and other surface discontinuities upon localized stress in this zone. Referring now to FIG. 16, element 60, which otherwise generally resembles the element of FIG. 12 has a slightly different electrode arrangement that produces a striking change in performance.

As in the prior instances, the plus and minus signs indicate the polarities originally impressed upon the respective electrodes prior to rewiring them as shown here. Element 60 may be of 1 piece or 2, hard-bonded along line 72.

Half of the electrodes on the left are seen to be connected to electrical header 69, 70, 71, which lies insulatively along the edge of the element nearest the viewer. The intervening set of electrodes is connected to a header along the opposite edge, which does not appear in this view.

Care must be taken, when operating the element as a projector, that the applied voltage is not sufficient to cause electrical breakdown between electrodes 63 and 64 or between electrodes 65 and 66.

Electrodes 63, 64, 65 and 66, each of which may or may not extend the full length of radiating faces 61, 62 of element 60, which faces are perpendicular to the plane of the paper, are provided as one of several possible arrangements for reversing the effect of the applied voltage upon the right end of element 60 so as to reverse the phase of vibration at that end and thereby change the element 60 from the twin, in-phase radiators of FIGS. 12, 13 and 15 to a dipole whose ends 67, 68 vibrate diametrically out of phase with each other.

Whereas in the elements of FIGS. 12, 13 and 15, the entire "beam" in each instance bows alternately upward and downward with each half cycle of impressed voltage, the element of FIG. 16 adopts an "S-curve" mode of behavior when used as a projector, the magnitude of the curvature, of course, being so slight as not to be visible. As a hydrophone also, the electrical effect of incident pressure waves upon the separated ends is opposite in phase.

Because the ends do not counterbalance each other's movement, element 60 shares with element 37 of FIGS. 10 and 11 a tendency to recoil slightly in oscillatory rotation when used as a projector.

If the link portion 70 of header 69, 70, 71 is omitted, the ends of element 60 may be separately connected to independent circuits for such other phase and circuit relationships as may be suited to the designer's purposes.

The elements shown in FIGS. 10 through 16 have been discussed chiefly from the standpoint of service as sound projectors. In fact, the proportioning of heavy and light sections seen herein is just as appropriate for stress control within the element as it is for impedance control at the skin. While, for design reasons, one might not always desire a hydrophone to have precisely the same characteristics as a projector, the functions are closely related; and the same element frequently serves on a time-sharing basis as both projector and hydrophone. More often than not, the geometry of the "pinging" projector is fairly well suited to the hydrophone that listens for the echos. The fact is that generally, and particularly in the transducers of this invention, the listening sensitivity patterns are similar to the projector radiating patterns.

The low frequency flexural resonance of these elements now makes it possible to use smaller elements than heretofore at any given frequency, whether from the standpoint of efficiency in a projector or of sensitivity in a hydrophone.

Figure 17:
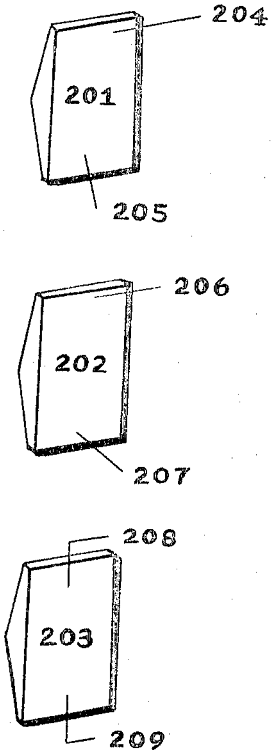
FIG. 17 is an oblique view of a line array of twin transducer elements in accordance with this invention.

Referring now to FIG. 17, it is seen that, with appropriately phased circuits, slim 6-element line transducer arrays, like the transducer array here that is actually composed of three twin, in-phase radiators 201, 202, 203, are convenient to use. The three elements have six zones of concentration of energy radiation, 204, 205, 206, 207, 208 and 209, in an unprecedentdly compact overall array, enabling the use of new carrier bodies and deployment methods.

Figures 18, 19, 20:
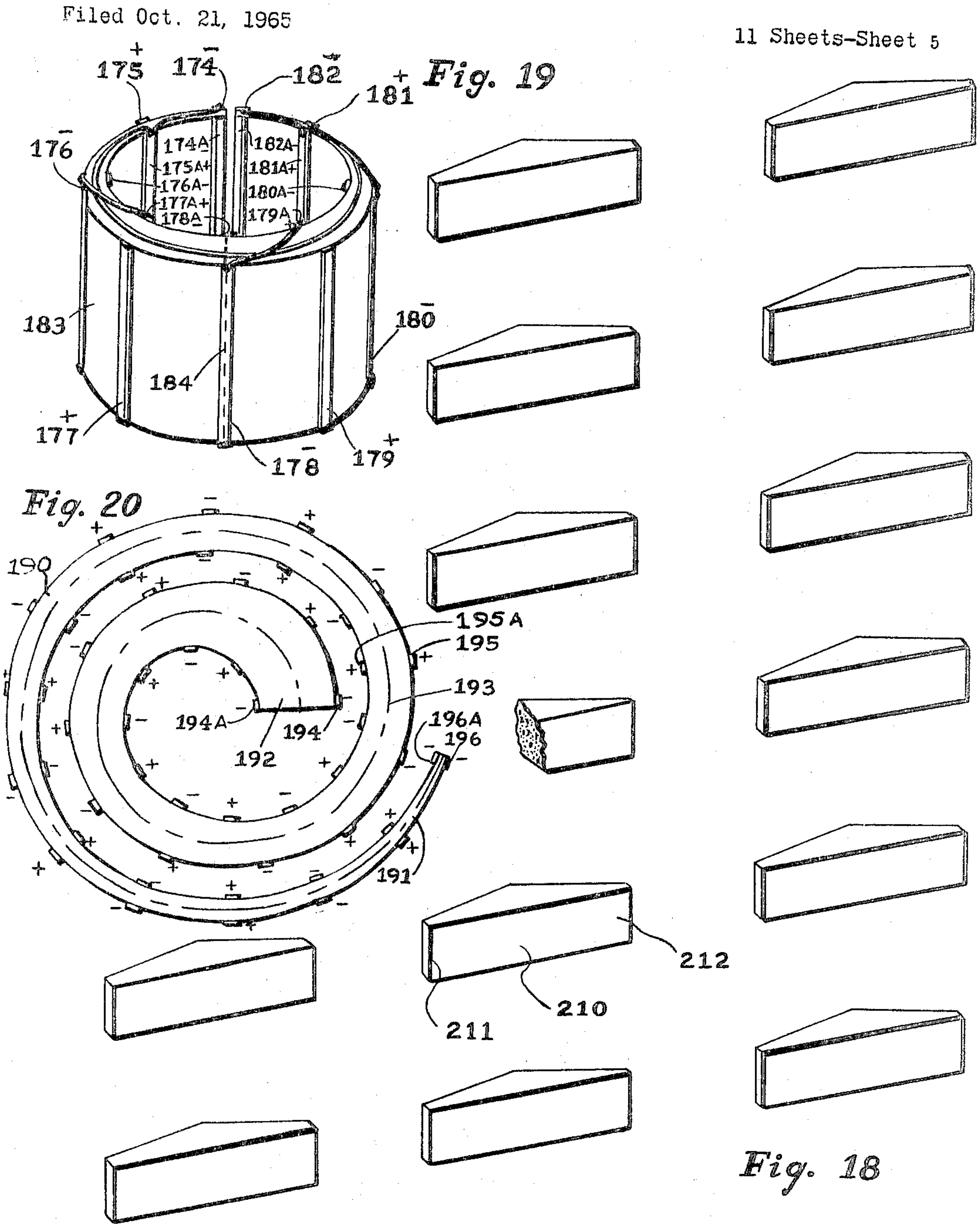
FIG. 18 is a matrix array of twin transducer elements in accordance with this invention.
FIG. 19 is an oblique view of a curved, proportioned-impedance transducer element in accordance with this invention.
FIG. 20 is an end view of a spiral, proportioned-impedance transducer element in accordance with this invention.

Referring now to FIG. 18, there is seen a portion of a large phased low-frequency array, adaptable for what is termed "electronic scanning," which actually-employs electronic switching and the use of delay lines for selection and phasing of appropriate element networks for search and tracking of military targets through large angular sectors without moving the transducers.

In FIG. 18, each twin radiator, such as 210, has two transmitting portions 211, 212, putting energy into the water normal to its surface, the radiated energy from all elements being perpendicular to the plane of the array when they are synchronously phased. One of the advantages here lies in the relatively small sizes of the individual elements and the slender nature of a wall containing these elements as compared with those of the prior art.

Referring now to FIG. 19, there is shown a tapered section, flexural-beam, curved transducer element 183, of the twin-in-phase-ends category. It is shaped somewhat as one might expect it to look if he were able to bend one of the double-ended, tapered, linear-beam transducers, such as element 39 of FIGS. 12 and 13, somehow into a curve so that the shear plane would assume a generally circular contour. When this is done, the beam takes on the general appearance of the element of FIGS. 4 through 9, except for a tapering cross section.

In one of the feasible arrangements for electroding and polarizing, the element 183 has outer electrodes 174, 175, 176, etc., and inner electrodes 174A, 175A, 176A, etc., which are polarized so that the odd-numbered electrodes will have one voltage signature (which may be negative as shown) and the even-numbered electrodes will have the opposite signature. After polarizing, the wiring connections are changed so as to produce opposite dimensional-change effects on inner and outer surfaces under applied voltage of any given sign. This effect may be produced by interconnecting odd-numbered outer electrodes 175, 177, 179, and 181 with even-numbered electrodes on the inner circumference 174A, 176A, 178A, 180A, and 182A at one end and interconnecting the remainder of the electrodes 174, 175A, 176, 177A, etc., at the other end as shown.

By cutting element 183 along the dotted line 184 running down the middle of electrode 178, we can have a pair of curved transducers analogous to the straight transducers of FIGS. 10 and 11. By omitting electrodes 174A, 175A 181A and 182A, another analogy would be established with the elements of FIGS. 14 and 15. Curved, tapered segments may be expected to find widespread use in transducers, such configurations being practically impossible with the bilaminates of the prior art, or at least highly impractical.

Referring now to FIG. 20, there is shown an edge view of a second form of curved proportioned-impedance transducer element 190, which permits obtaining the highest power and lowest resonant frequency yet possible in a compact element. Element 190 has a single radiating tip 191, which rather closely overlaps the heavy-walled portion 192. These elements can be wound with as many convolutions as desired, subject to the risk of broadening the radiated beam excessively and of discharging an increased percentage of energy uselessly between the convolutions, though means for overcoming such risk will appear hereinafter. Another problem is that of holding the element in the firing kiln in such a manner as to retain the as-formed configuration intact against excessive distortion during shrinkage. The elements of this type may be rested during firing on uncured plates of the same material which will have the same shrinkage rate but which will be less subject to damage than would the more delicate element shown. After firing, the element may be machined, ground, or otherwise cut from its supports. The convolutions may also be anchored together with small links of the same material before firing and then cut apart thereafter.

The greater the length of element wound into a small spiral, the lower will be the frequency of resonance achievable in the volume of the spiral. The less the taper from heavy end to lightweight tip, the less will be the rate of increase of motional impedance from the tip to the thick end; thus the angular width of the band of well coupled low-impedance material will be greater and the directivity will be less. The broadening of the angular sector of radiation can be controlled by other means to be discussed in later disclosures in this series.

As with circularly contoured elements, spiral elements like 190 may sometimes have different electrode spacings on opposite sides of the material wall. When the spiral element 190 is sharply curved as shown, it may be necessary to work out special electroding schemes. Electrodes 194 and 194A are opposite each other at the heavy end of element 190; but, proceeding outwardly along the spiral, the outer and inner electrodes are not necessarily aligned along the same radii of curvature until approximately a full revolution has been made at electrodes 195 and 195A.

Thereafter, until electrodes 196 and 196A are reached at the tips, all of the remaining electrodes are radially aligned, such alignment being of maximum importance in the thin areas because of the possibility of catastrophic breakdown during polarizing if the distance between a positive electrode and any negative electrode becomes too small across the thickness of the material.

Again, as in the other cases in this series, all negative electrodes on the outer face of the spiral will be soldered or otherwise connected to the same header that is connected to all positive electrodes along the inner face. Generally such a common connection array will be made at one edge, such as that which appears in the view; the remaining connections would then be made to a second header arrayed along the edge surface hidden in FIG. 20. When the headers are then paired across a source of alternating current, the element will flex about its shear spiral 193, the overall curvature of the spiral alternately increasing and decreasing. Most of the power will be delivered into the immersion medium by the low-impedance portion approaching the tip 191 in a highly unsymmetrical radiation pattern, that may be further accentuated by the judicious placement of reflector materials on the element.

Figure 21:
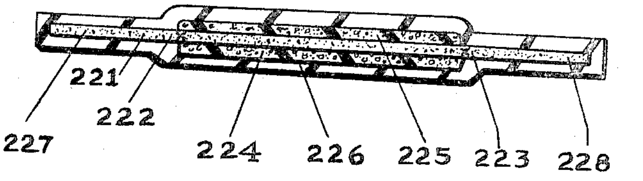
FIG. 21 is a sectional view of a selectively decoupled flexural flag transducer of this invention.

Referring now to FIG. 21, there is seen a flexural-flag transducer element 221, such as seen in FIGS. 1 through 3, which, when resonating in its simplest, low-frequency mode, exhibits nodes at 222, 223. If the element is electroded so as to flex when energized electrically at this frequency, the ends will flex in phase with each other and will radiate energy in parallel courses when so flexing.

The mid-portion, between the nodes, also radiates in a direction perpendicular to the surfaces, but the direction is anti-parallel, that is, 180° out of phase with the radiation from the ends. Such energy could destructively interfere with the energy radiated from the ends. In a hydrophone, the impulse received at the mid-portion could bring about cancellation of the voltage generated when the same wave front strikes the ends.

Therefore, decoupling material 224, 225 has been applied to opposite flat sides of element 221 between nodes 222, 223 in order to isolate the mid-portion of element 221 from exchanging energy with the immersion fluid via the insulating and waterproofing elastomeric coating 226. This will exclude most of the energy, that would otherwise be radiated from the middle, from interference with the energy emitted by the ends of element 227.

The decoupling material preferably also extends over the slender edges, one of which has been cut away to expose this sectional view.

Alternatively, all of the surfaces outboard of the nodes might have been covered with the decoupling coating, in which case the radiation received by the fluid would have issued from the mid-portion. If it were desired to operate the element at a higher frequency, in the neighborhood perhaps of a higher resonance mode, a more complex pattern of decoupling material would have to be applied because there would then be more nodes; at each successive one of which the direction of vibration is reversed.

Figure 22:
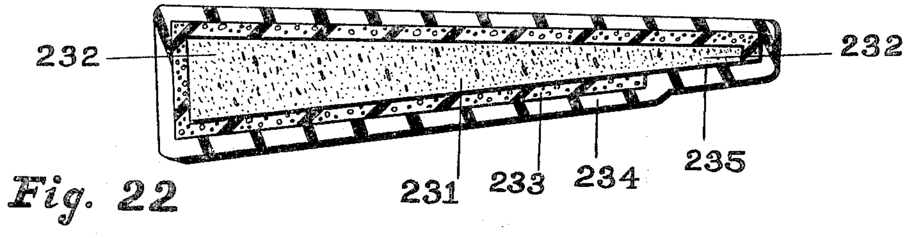
FIG. 22 is a selectively decoupled, self-mass-loaded, proportioned-impedance transducer of this invention, shown in cross section.

Referring now to FIG. 22, there is seen one of the tapered-beam types of proportioned impedance transducer 231, which has its highest motional impedance at the heavy end. In this particular case, it is desired that only a selected surface area, designated 235 in FIG. 22, be coupled to the fluid for delivery of a directional sound pulse. Therefore, cellular decoupling material 233, containing air cells, has been applied to element 231, upon all surface areas except 235, in order to isolate all except that portion from energy exchange with the fluid.

Figure 23:
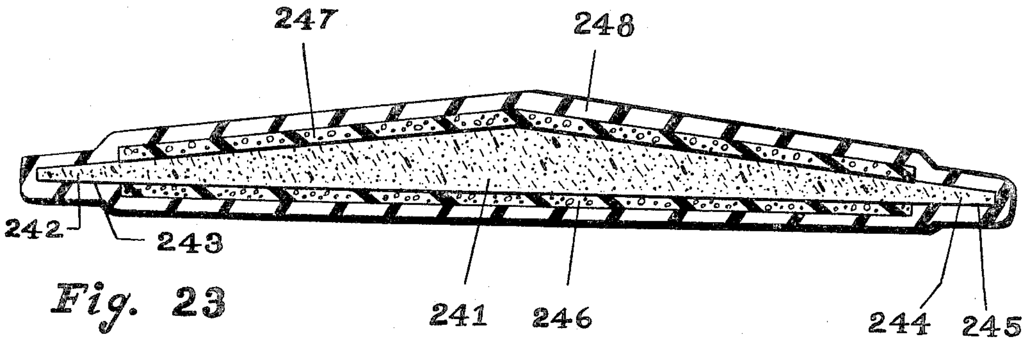
FIG. 23 is a sectional view of a selectively decoupled twin element of the character of that shown in FIG. 22.

Referring now to FIG. 23, another proportioned-impedance transducer, twin in-phase radiator and receiving element 241, is seen. Element 241 has two low-impedance ends, it being desired to restrict energy exchange to the ends for optimum performance. Cellular decoupling coating 247 has been applied to most of the area on one side of the element and cellular coating 246 to corresponding areas on the opposite side, similar coatings being applied along the edges, which cannot be seen in this cross-sectional view. This leaves only ends 242 and 244 to transmit and receive signals. Insulating coating 248 is applied overall to prevent short-circuiting of the electrodes in the water, the electrodes not being shown herein because they do not directly relate to the novel accomplishment here. Element 241 now has improved performance as a twin transducer because the effect of the central mass loading and impedance mismatch in the middle areas is heightened by the application of isolating materials over these high-impedance surfaces.

Figure 24:
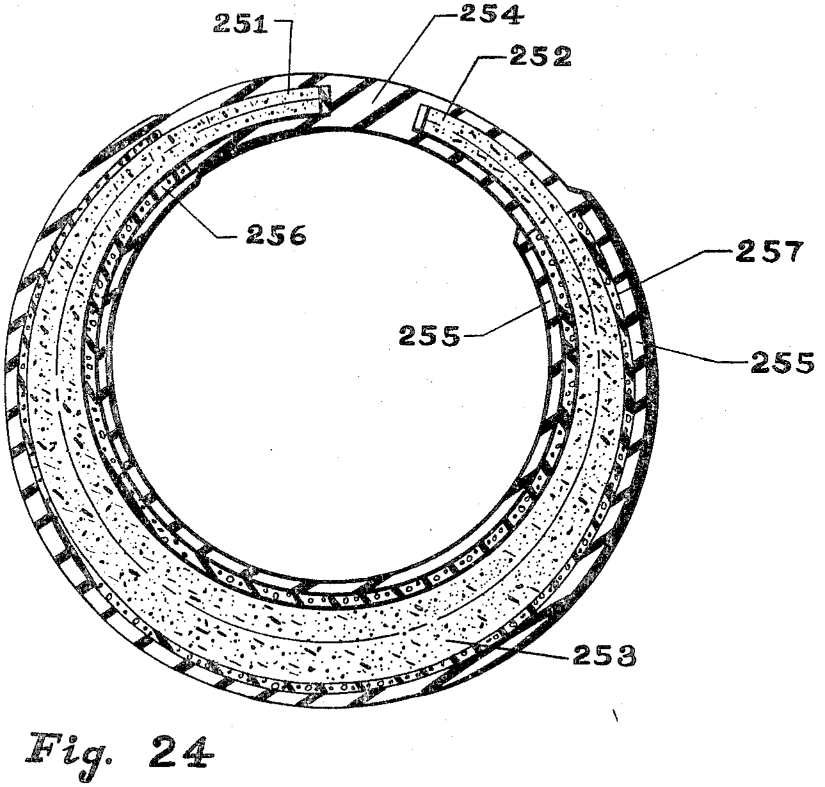
FIG. 24 is a sectional view of a selectively decoupled, curved, proportioned-impedance transducer of this invention.

In FIG. 24, transducer 253 is representative of twin in-phase elements of the proportioned-impedance type like that of FIG. 19. The maximum excursion at resonance takes place at the ends 251, 252, the midportion of the curved "beam," where the motional impedance is at a maximum, being diametrically opposite the gap 254.

The novel aspect of the transducer of FIG. 24 resides in the combination with and directly upon its higher-impedance surfaces of decoupling coatings 256, 257 of cellular elastomers, which, because of the extremely low acoustic impedance of their contained air, transmit relatively little energy between the very-high-impedance element surfaces and the water. Coatings 256, 257 are applied directly upon the element 253 for best performance, though other insulating coatings may be applied under or over them. Thus their effect is one of heightening the mismatch, or accentuating the characteristics of the element 253. Coatings 256, 257 together cover the whole element 253, inside, outside, and edges, except for ends 251, 252. These segments may be of any desired angular width.

Element 253 has a conventional overall coating 255 of neoprene, polyurethane, or other suitable encapsulant, preferably elastomeric, which material also fills up slot 254, affording a measure of mechanical and handling protection to element 253 without substantially impairing the performance.

Element 253 is loaded from without only where it is desired to receive radiation when the element is serving as a hydrophone or to deliver the radiation when it is a projector. It tends to vibrate as a self-mass-loaded free body everywhere except at the tips which are localized thrustors into the fluid medium and thus rob the body of some of its freedom. (In a hydrophone they will be sensitive feelers.)

Figure 25:
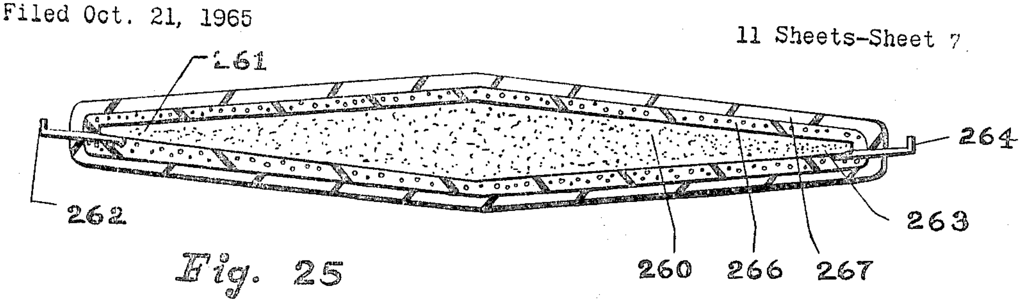
FIG. 25 is a cross section of a proportioned-impedance, decoupled, double-ended, lever-tipped element.

Referring now to FIG. 25, there is shown a double-ended element 260 covered all over with decoupling material 266 except that levers 262 and 264, bonded respectively to ends 261, 263 of element 260, project endwise through the decoupling material. Levers 262, 264 are not shown covered even by enrobing material 267, an insulating and waterproofing elastomer which covers the balance of the transducer. Alternatively, they may be so covered, with slight loss of sensitivity, if elastomer 267 has an impedance near that of water.

Tip levers 262, 264 may be attached to element 260 by soldering or securing with a thin, hard epoxy bond over the tip electrodes. If they are soldered, the electrodes under them must be parallel-connected in the circuit, and, in any event, it is usually desirable that some electrically insulating means be interposed between the electrodes and any metallic portions of the tips 262, 264 that are exposed to water. The levers may be flared out to greater widths than that of the element itself, if desired. This construction does not improve sensitivity or power radiation. It does permit a more accurate timing of the instant of arrival of a pressure wave first at one end and then at the other.

Figure 26:
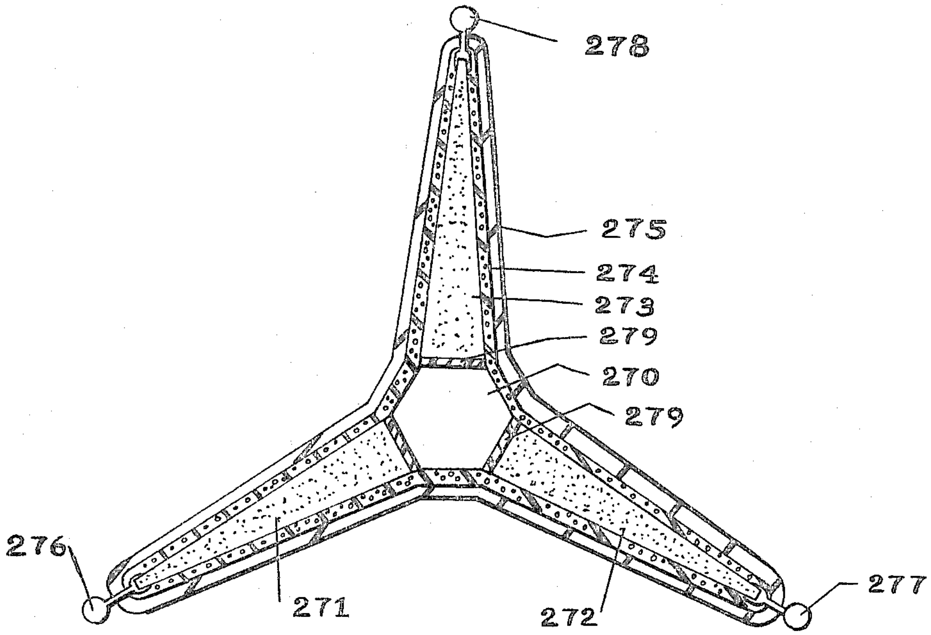
FIG. 26 is a cross section of a tripolar array of proportioned-impedance, lever-tipped, decoupled elements.

Referring now to FIG. 26, there are seen three proportioned-impedance elements 271, 272, 273 made in accordance with another disclosure in this series. Each element 271, 272, 273 is secured at its base preferably by a very thin layer of hard adhesive 279 to block 270, which joins the elements mechanically and may serve as a common ground if such is compatible with the signal circuits used.

Three pairs of leads may be taken from the three distinct arms. The preferred manner of electroding, polarizing and wiring each element 271, 272, 273 is seen at either end of element 60 of FIG. 16 (with connection 70 omitted). Although it is often preferable to use a hardened block 270 as a junction, useful results may still be obtained even if the space taken up by block 270 is filled instead with other solid material, even such an elastomer as that used to make enrobing and waterproofing coating 275. The substitution of decoupling material 274 for block 270, in order to isolate the elements from each other as they are isolated by this material from the water, may be desirable sometimes, particularly in hydrophones.

Although, for the purpose of radiating or listening to sound, the transducer assembly of FIG. 26 would be more efficient if the tips of the elements 271, 272, 273 were left uncovered, as were those of the elements in FIGS. 21, 22, 23 and 24, the assembly of FIG. 26 will function more precisely as a timing device or "velocity hydrophone" if the decoupling material 274 covers each entire element 271, 272, 273 except for the ends of levers 276, 277 and 278, which are tipped with small cylinders that appear circular in this view. These cylinders may be of greater length than the thickness of the element.

It is not necessary to rotate this transducer in order to search around the compass, because this triple-element transducer always has three 120°-divergent pairs of poles to furnish data on the target.

Figure 27:
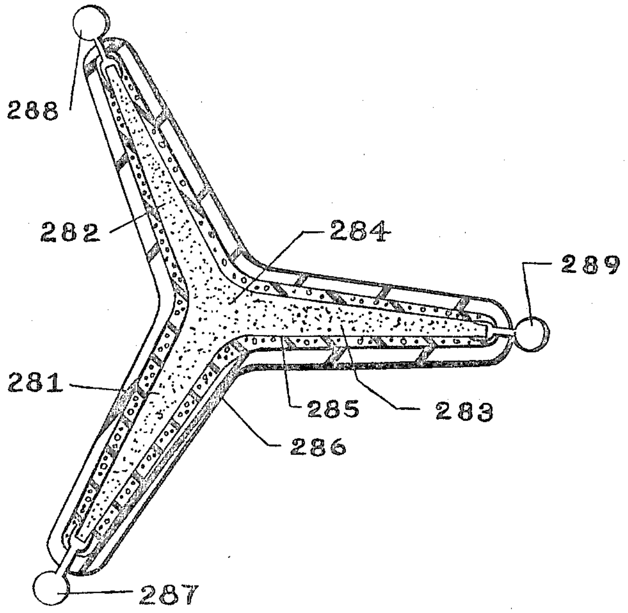
FIG. 27 is a cross section of a single tripolar, proportioned-impedance, decoupled, lever-tipped element.

Examination of FIG. 27 shows that the three flexural-beam elements seen in FIG. 26 may be replaced by a single tripole element 281, 282, 283 cast integrally with center section 284. Ball-tipped levers 287, 288, 289 are secured to the tips as were the cylinder-tipped levers of FIG. 26. Again, the active material is decoupled by release material 285 and waterproofed by enrobing coating 286.

Figures 28, 29:
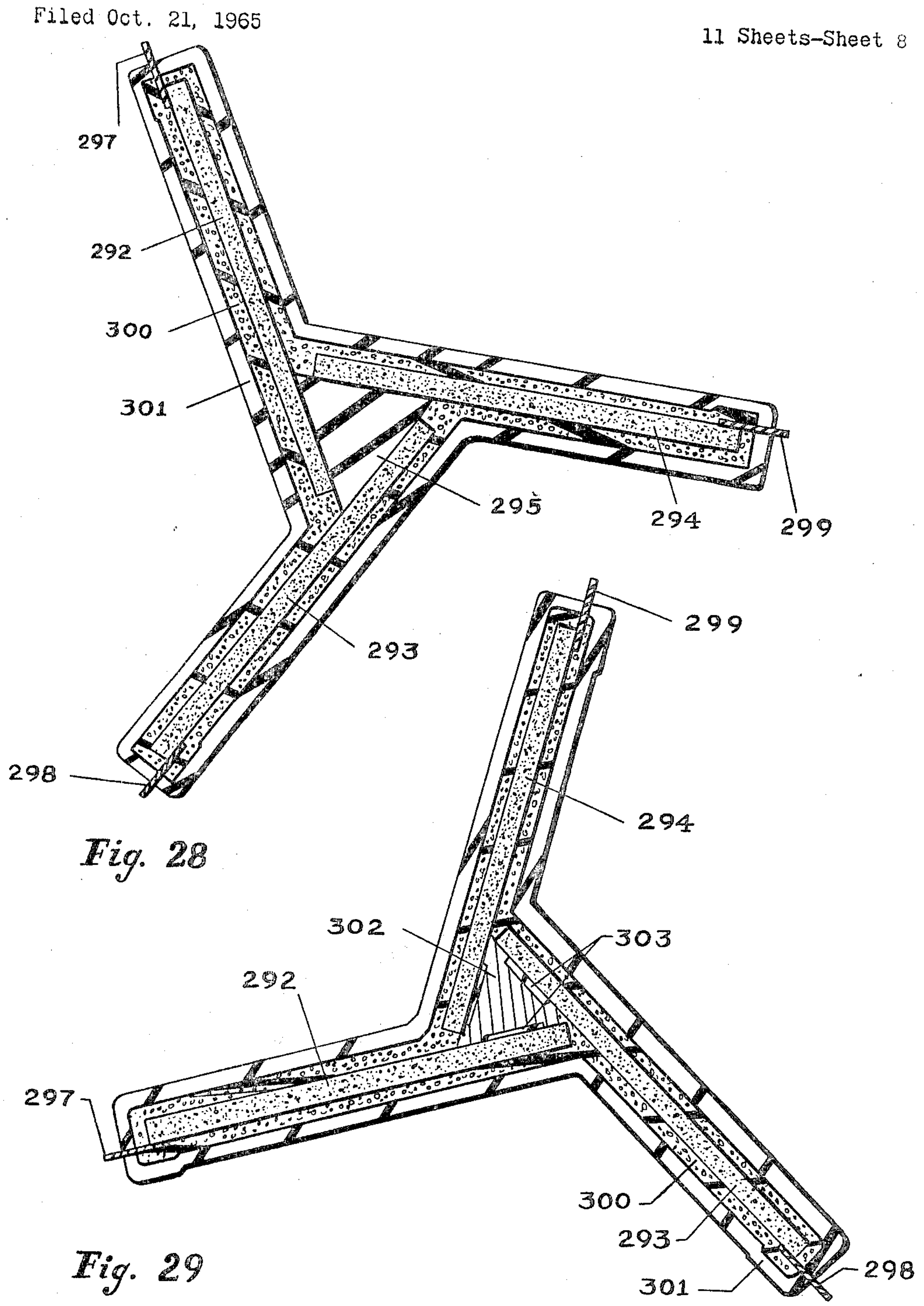
FIG. 28 is a cross section of another tripolar element assembly.
FIG. 29 is a cross section of still another tripolar element assembly.

Referring now to FIG. 28, there are shown three flexural-flag elements 292, 293, 294 arrayed along the projected sides of triangle 295, of plastic or an elastomer. Each element has a lever, respectively 297, 298, 299, soldered or otherwise hard-bonded to its tip. These levers, only the cross sections of which are seen, may be quite long in the plane perpendicular to the paper, being limited in length primarily by stiffness considerations.

All three elements are completely covered, except for the ends of the levers, with release material 300, and the whole assembly (except lever tips) is preferably coated with a waterproofing and enrobing elastomer 301 which, as in prior instances, should have a low curing temperature that will not adversely affect the polarization of the elements.

Referring now to FIG. 29, there are seen identical flexural-flag elements and tips, similarly covered with release material 300 and enrobing material 301. The difference is that the elements in FIG. 29 are each hard-bonded to heavy metallic prism 302 which preferably has a low thermal coefficient of expansion and serves as a rigidly coupled, heavy mass load. Zones of bonding are preferably selected as shown to insure that any possible electrical contact with the prism can involve only electrodes having a common ground connection. Prism 302 is relieved and filled with enrobing material 303 on each of its three sides where ungrounded element electrodes might otherwise be shorted out.

Figure 30:
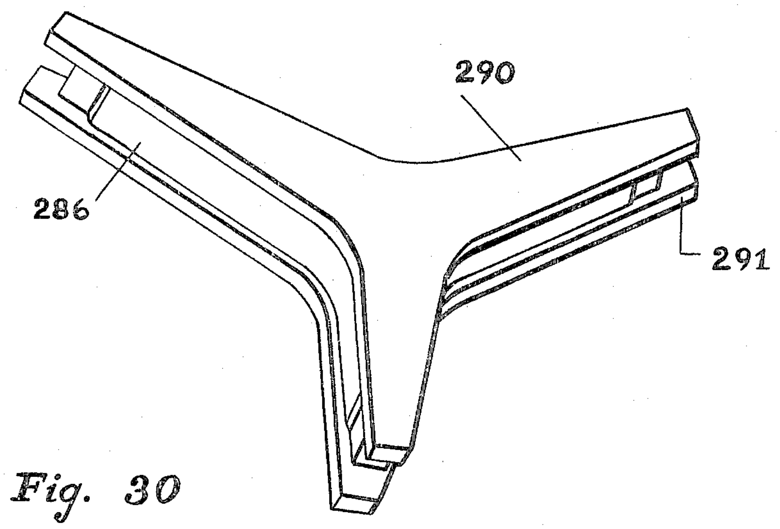
FIG. 30 is a view of a tripolar transducer complete with guard assembly.

Referring now to FIG. 30, a pair of guards 290, 291 is seen assembled above and below the element of FIG. 27; but any other tripolar array might have been used. Guards, which are decoupled from the elements, are not essential to the functioning of the transducer and so offer only impact protection. Ball projections are omitted and elements are decoupled all over except at the tips. A combination of two dipolar elements like those of FIGS. 16 and 25, or of a pair of in-phase elements, as in FIGS. 1, 3, 12, 13, 15, and 23, makes a quadrupole; and finer compass divisions can be resolved with other combinations.

As indicated hereinabove, cellular elastomeric materials containing air have long been known for their reflective properties toward sound travelling in dense media, but lose effectiveness when submerged beyond the point of collapse or rupture of cell walls. They may partly recover when stress is removed. Rigid foams, organic or metallic, do not have equal recovery capability.

Cellular decoupling materials were applied herein to various elements for preventing energy transfer via certain or all surfaces and thus achieving distinctive characteristics. A number of wholly new element and electrode configurations have been introduced and combined with decoupling materials with striking results.

Strong materials, such as steel, have often been employed in conjunction with ceramic ferroelectrics in transducer structure. Such materials are used, for example, to make housings in which the carefully mounted, relatively small elements serve as acoustic "windows." The designer eagerly pairs his elements with comparatively large metallic structures because of his confidence in the tensile strength, machinability, and non-susceptibility to fracture of metal parts. The designer's normal precautions have not been vain; they have been absolutely necessary in terms of the transducer designs in which they are employed.

Referring now to FIGS. 31 through 35, it will be shown that high-strength materials in unique forms, for example in gauges thinner than a hair, are very useful as minor structure, subsidiary to the now relatively massive element, for enclosing multitudes of tiny air cells in a high-pressure environment. It is further shown that proper application of high-strength materials will permit us to reduce the very high stresses now imposed on deeply submerged elements to the level of the ambient hydrostatic pressure, and to reduce the size of the element itself, while eliminating most of the ancillary structure.

It is not suggested that these high-strength materials be substituted generally for cellular materials in the decoupling of element surfaces. At shallow levels, cellular materials are usually best suited. As depth of immersion is increased, the cellular materials employed must be firmer, and they will give less isolation to the surfaces. Eventually depths are reached at which the firmest cellular materials will go solid and transmit excessive energy. It is at these depths that we also note the marked diminution of the ratio between the relatively faint acoustic ripple and the hydrostatic pressure level upon which the ripple is superimposed. It is in the pressure regime too severe for ordinary cellular materials that the high strength decoupling structure has maximum usefulness. It cannot, however, be expected that the quality of decoupling or acoustic isolation achievable near the surface can be duplicated at great depths.

In order to maintain continuity, no direct references were made to the high-strength decoupling structures in the descriptions of FIGS. 21 through 30. Yet the transducers shown therein will share benefits of the disclosures of FIGS. 31 through 35 as much as they would had they been drawn with high-strength decoupling structures assembled upon them. Therefore, these structures, which will be described and shown only on the last five figures herein, nevertheless, pertain to FIGS. 21 through 30 just as much as they would if each of them were repeated once more on each of the several transducer structures.

Figure 31:
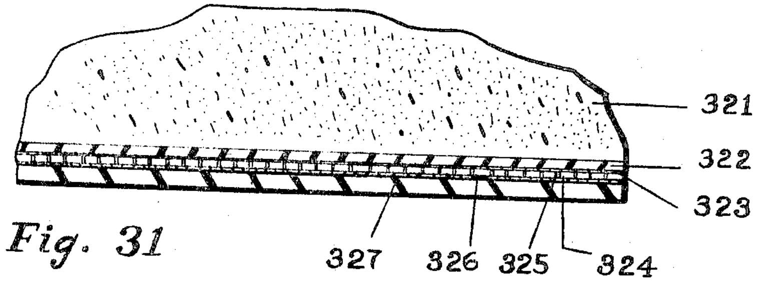
FIG. 31 is a fragmentary section of a transducer assembly showing a preferred form of selective decoupling arrangement suitable for high environmental pressures.

Referring first specifically to FIG. 31, there is seen a fragmentary portion 321, much enlarged, of a ferroelectric ceramic transducer element. Next to the ceramic, there is a layer 322, preferably of soft elastomer capable of insulating any electrodes on the ceramic surface from the following layers. The next layer is a thin metallic sheet 323. For optimum depth performance, the sheet 323 might be of steel, perhaps or the order of a thousandth of an inch thick and rolled, drawn, or heat treated to a tensile strength on the order of 300,000 p.s.i. Next comes an openwork grid 324, 325, which may be of woven screen, perforated metal, expanded metal, embossed metal, etc. Outside the screen or grid 324, 325, there is another sheet 326 which may be like the first sheet 323; and following this sheet 326 comes an enrobement of potting material 327, preferably also of an elastomer and consisting of one or more layers.

When the transducer of which FIG. 31 is a portion is subjected by immersion to hydrostatic pressure exerted via enrobement 327, the elastomers 322, 327, behave somewhat like fluids and cause the sheets 323, 326, now each behaving as a continuous array of tiny diaphragms over the holes 324, in grid 324, 325, to be dished into openings 324 in grid 324, 325. Preferably the openings in grid 324, 325 are so proportioned that at the design depth the sheets 323, 326, which are serving as pressure plates or diaphragm arrays, do not come into contact with each other within the openings 324 in the grid 324, 325. The solid portions 325 of the grid 324, 325 are preferably as slender as possible but must be strong enough to support and keep the sheets 323, 326 separated with no incipient collapse at the working pressure. A tendency on the part of sheets 323, 326 to enwrap themselves more intimately about the solid portions 325 of grid 324, 325 will be manifested by increasing energy transmission through the decoupling array as the depth is increased. Such transmission will be undesirably stepped up if the sheets 323, 326 begin to abut within the holes 324.

Pressure plates or sheets 323, 326 may or may not be welded to grid 324, 325, the performance requirements and assembly conditions determining the answers. When welding is done, no matter how little, the sandwich structure is stiffened and conforms less well to curves or irregularities in the ceramic. It also tends to cause more transmission of energy. Often, however, it may be desirable to spot-weld or epoxy bond the sheets 323, 326 to the grid 324, 325, particularly along the outer edges.

The arrays of interconnected diaphragms constituted by sheets 323, 326 together comprise a highly redundant beam structure, friction-bonded, for the most part, against yielding by slipping along the planes of contact and tending to lock more tightly together as environmental pressure is increased and the hydrostatic stress in the elastomers 322, 327 pushes the diaphragms into the holes.

Figure 32:
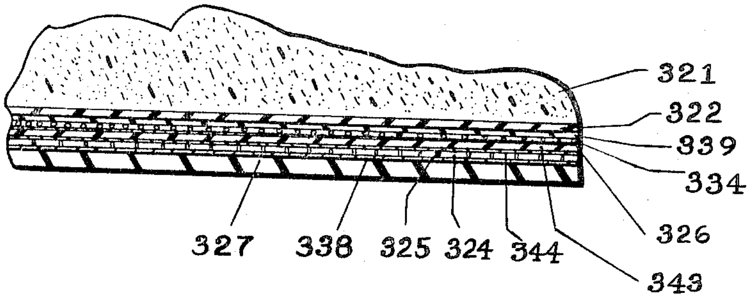
FIG. 32 is a fragmentary section of a transducer assembly showing a second form of decoupling arrangement.

Referring now to FIG. 32, a similar fragment of a ceramic transducer element 321 again has a layer of elastomer 322 close to it, followed by a sheet 339 of molded fiber glass. As in the prior and succeeding cases, the elastomer 322 may optionally have been coated directly on the transducer or it may have been applied to sheet 323 before assembly of the latter to element 321. Again optionally, coating 322 may be produced by solvent evaporation, polymerization or other means from liquids or powders, or it may be stretched on a sheet or tape. It need not be a single layer; and it is not mandatory that it be so readily identifiable an elastomer as rubber or "neoprene." Coatings of other plastic materials can be made to work.

The next item seen is a row 334 of spaced glass fibers. Cements or binders can be used to hold the glass fibers 334 in place; however, the more the gaps are filled by such materials, the more energy will be transmitted.

Following the second sheet 326, a layer of elastomer 343 is applied. Next, another sheet 344, and then a grid 324, 325 are laid on; and then a fourth sheet 338 is applied over the grid 324, 325. The element is then preferably potted or enrobed with an elastomeric coating 327, which may consist of one or more layers.

One purpose served by using a multiplicity of isolation layers, as in FIG. 32, is that of obtaining better isolation between the element and the water surrounding it. One reason for choosing different constructions in the several layers is to improve isolation at certain frequencies where one type of material or one size of grid opening may pass more energy. Certain elastomers, such as the butyls, tend to absorb energy by internal friction, generating heat rather than yielding reactively.

Figure 33:
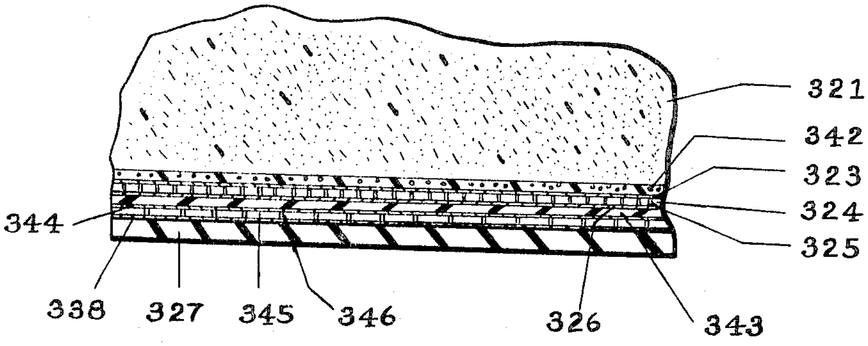
FIG. 33 is a third fragmentary section showing another decoupling arrangement.

Referring now to FIG. 33, there is seen another multiple-layer decoupling arrangement. The ceramic element 321 has next to it a layer of closed-cell sponge rubber 342. The cellular elastomer 342 is, of course, subject to greater dimensional excursion under applied pressure than are the non-cellular types. On the other hand, cellular types are well known for their desirably inherent reflective properties toward acoustic energy.

Next, there is a sheet 323, like that previously seen in FIG. 31, followed by a grid 324, 325, another sheet 326, then a layer of elastomer 343, a third sheet 344, another grid 345, 346 of different spacing, and a final sheet 338 just within the enrobing elastomer 327. The different spacing of the second grid 345, 346, may help trap out one of the frequencies tending to be passed by grid 324, 325.

Figure 34:
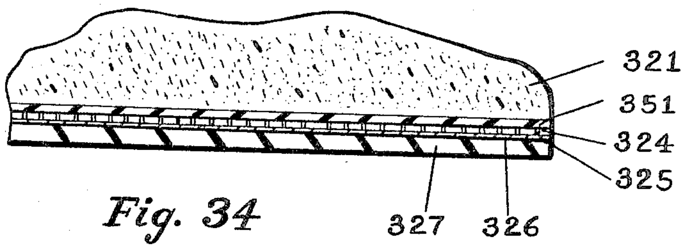
FIG. 34 is a fourth fragmentary section showing a decoupling arrangement.

Referring now to FIG. 34, the structure therein is elementary and inferior to the others; but it is cheaper and may have value where space is very limited. The layer 351 next to element fragment 321 is a plastic film capable of insulating electrodes on element 321 from being short-circuited by grid 324, 325. The film may be dip-coated or otherwise applied. Or it may be a sheet, even say, of "Mylar" and may or may not be bonded to the ceramic 321. Grid 324, 325, sheet 326 and enrobement 327 have been previously described.

The principal reactive excursion is the dishing of sheet 326. Such limited compliance will often be adequate. Grid 324, 325 will penetrate layer 351 and will render it useless unless the latter is so firm that sheet 326 will not be contacted by the material from layer 351 at pressures below the design limit.

Figure 35:
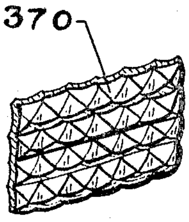
FIG. 35 shows a fragment of embossed metal applicable to the decoupling of transducers.

Referring now to FIG. 35, there is shown a fragment 370 of embossed material of a diamond pattern having alternate crossed rows of peaks on each side. This regularly patterned piece can serve as a grid, if desired. It will also serve as does a sheet, like 323 or 326 in prior figures; and it is useful in multiple thicknesses provided that precautions are taken against nesting. Embossed sheets are preferably thin and hard for deep immersion.

It is the well distributed network of low-impedance air pockets trapped between the strong structural sheets that blocks the transmission of much of the energy otherwise available from the skin of the element. This air serves in exactly the same manner as does the air trapped in a cellular material. However, a cellular material becomes progressively poorer in performance with increasing depths of submergence, until at relatively shallow levels it ceases to function because the contained air cells have diminished volumetrically; and, therefore, the cross-sectional area available for energy decoupling becomes smaller also. Eventually cellular materials go substantially solid and become useless.

The air cells trapped between the layers of structural materials herein suffer less diminution in area because the strength of the materials rather than the pressure of air from within now resists hydrostatic pressure. As the strong, elastic, sheet materials are pressed into more and more intimate contact with the grid, some diminution of pressure-release or low-impedance area does occur, but the rate of loss of such area is less than the rate of loss of area due to subjection of air cells in cellular elastomers to increasing environmental pressure. These air cells shown herein are each bridge by individual diaphragms, each diaphragm remaining part of a continuous sheet of elastic high-strength material, friction bonded and bonded by its own deformation fixedly to the lacework walls of the grid structure.

Eventually the diaphragms being dished inwardly from opposite sides of the grid will begin to bottom against each other and lose much of their value. However, the amount of such elastic deformation that can be withstood without catastrophic collapse by hard-rolled very thin diaphragmes spanning small openings is surprisingly high, as may be seen by performing the calculation for a 300K p.s.i. very hard rolled foil forced into, say a $\frac{1}{16}$ inch square opening in a hardened grid, the foil being perhaps a thousandth of an inch thick. These structural materials are elastic and, therefore, fully capable of recovering from deformation within their wide elastic ranges.

Yet the strong but delicate appearing structural materials herein do not play the old role of strongback for the ceramic. Instead, they lie compliantly against the relatively massive walls of the element. They do not shield the ceramic against stress, though in their resilience they offer a new kind of protection for the ceramic against accidental impact. The ceramic now carries all of the ambient pressure loading down the great depths; and it carries the load easily because the environmental pressure is simply borne isostatically in compression. The brittle ceramic is not artificially forced, as in the past, into the roles of diaphragm, beam, arch, or bulkhead, subject to the tensible stresses that accompany bending.

If not properly applied, multiple layers of grids and pressure plates may combine to form a composite structure that is stiffer than desirable. Care should be taken that no such steps as welding, soldering or otherwise bonding of the layers will cause the structure of the decoupling materials to fail to lie compliantly upon the curvatures and irregularities of the ceramic surface.

Decoupling means composed of layers of plastic and plastic/glass fiber strands will often rely somewhat more on damping and less on reflecting energy than will the all-steel types, particularly when organic binders are used with the glass fibers. Care must be taken that organic binders are not used so generously that they tend to broaden the contact lines or fill up the voids, and thus seriously impair the reflecting ability.

Still greater advances in the art of transducer-element isolation from hydrostatic loading are achieved in FIGS. 36 through 40. The element is taken completely out of the water and placed in a sealed, dry, housing. Then even the columnar loading seen in the first embodiment is removed. Next the element is mass loaded within its decoupled housing. Arrangements of plural elements within the housing are seen, and it becomes apparent that we may put the transducer and its circuit inside the same dry, unpressurized case, without any of the damping introduced by waterproofing materials and with none of the noise pickup and self-noise experienced with immersed cables, connections, etc., in the high-impedance zones of the circuitry. Clamping arrangements for mass loads enable us to design for maximum sensitivity rather than for ruggedness.

Figure 36:
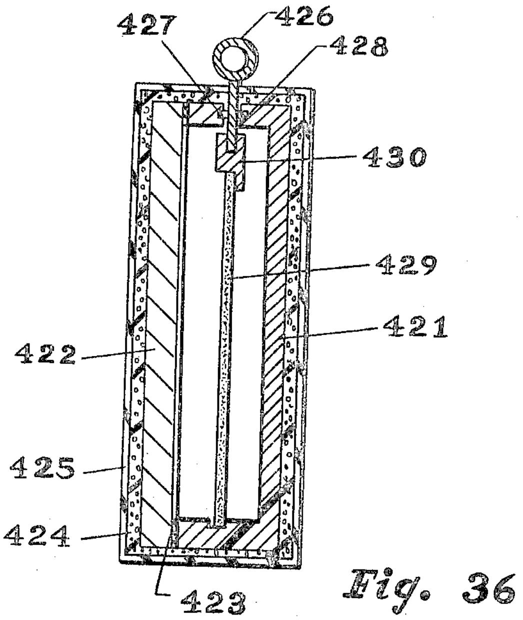
FIG. 36 is a cross section of a transducer assembly particularly suited for use at the high hydrostatic pressures of deep submergence.

Referring now to FIG. 36, there is seen an enclosure made up principally of housing 421 and cover 422, which are sealed by any suitable gasket 423 and may be assembled by means of any suitable fasteners. The enclosure is shielded from the effects of transient pressures by decoupling material 424, which may be a cellular elastomer, preferably of closed cell structure, or perhaps one of the high-strength-material types introduced herein; and the decoupling material 424 is further protected against any leakage into its cells by waterproof elastomeric skin 425.

If the decoupling 424 and waterproofing 425 coatings have been applied over the whole structure in a manner suitable for holding it together during shipping, handling, etc., separate fasteners will not be required. Normally a waterproof connector of any suitable design will have been arranged for communication, via either cover 422 or housing 421, with electrical circuitry elsewhere located. Since the structure has been decoupled from transients, the element will be more sensitive to them.

Lever 426, the outer end of which is not isolated by any decoupling means, extends through hole 428 in housing 421, the hole being sealed by gasket 427. The outer end of lever 426 may have any suitable shape for sensing pressure transients. It should combine minimum weight with maximum rigidity.

The hole 428 through which the stem of lever 426 extends is only very slightly larger than the stem, within a clearance of perhaps one or two thousandths of an inch, such clearances being customary for openings sealed by O-rings, etc., which can resist very high pressure differentials. While this order of clearance may seem small, it can be enough to clear the excursions of lever 426 under all likely pressure transients. Element 429 may be flexural flag, a curved type, a tapered type, electroded on one face or two, or even a bilaminate. It is adhesively bonded at the lower end in a keyway in housing 421. The upper end is bonded to adapter 430, which in turn is firmly bonded on the stem portion of lever 426.

Since the electrodes on opposite sides at either end of element 429 are likely to be connected into their electrical circuits at points of opposite polarity, at such times it becomes necessary to prevent short-circuiting. At the same time, the element stiffness that will keep it responsive to transient requires that the adhesives be thin and hard. Soldering the support directly to element electrodes is mechanically feasible but it closes an electrical circuit Although epoxies are insulators, their low modulus is of concern when they form part of a pressure path. FIG. 36 indicates that element 429 is hard against the faces to its right and that its ends fit snugly between adapter 430 and the bottom of the slot in housing 421. There is a slight clearance on the left side of the slot and adapter 430 has been cut away to the left of element 429. Provided that the electrodes of element 429 have been properly insulated, such precautions can be reduced. The structure of FIG. 36 relieves element 429 of all effects of hydrostatic pressure except that a columnar load equal to the product of the area of opening 428 times the hydrostatic pressure is imposed. Element 429 is, therefore, not wholly relieved from the effect of hydrostatic pressure.

Transient sonic pressures incident upon lever 426 will impose momentary stresses on element 429; and the output of the element will be a function of the relative intensity of these stresses as well as of their orientation.

Figure 37:
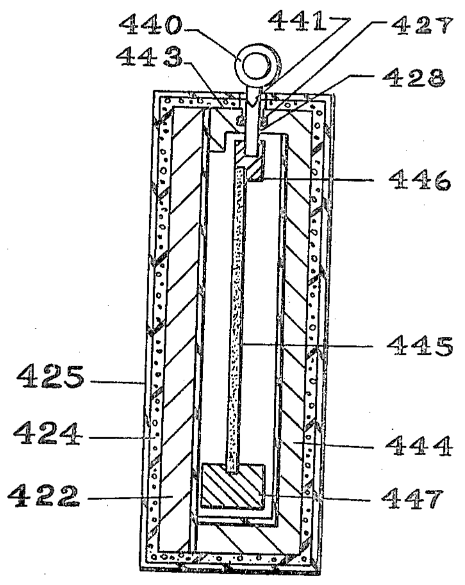
FIG. 37 is a cross section of a transducer assembly alternative to FIG. 36.

Referring now to FIG. 37, the differences are quite significant. Lever 440 is shown whole, not cut away like the other components. It has a pair of knife edges, one of which 441 is seen extending upwardly from the plane of the paper. The knife edges bear upon upper surface 443 of housing 444, this surface having been hardened so that it will not be brinnelled.

Whereas in FIG. 36 the hydrostatic load across opening 428 was borne by element 429, here it is delivered by the knife edges 441 of lever 440 to surface 443 and is not felt at all by the ferroelectric material of element 445. As in FIG. 36, adapter 446 is bonded to the stem of lever 440 and element 445 is bonded to adapter 446 in turn. However, the lower end of element 445 is not bonded to housing 444 but only to mass load 447 which is free of connection to any part of the enclosure. The inertia of mass load 447 is the means by which transient-pressure loads delivered by lever 440 to element 445 are reacted. If we wish element 445 to reflect low-frequency signal energy into the circuit, the mass of mass load 447 must be high. One of the tapered elements shown hereinbefore might have been substituted for the combination of element 45 and mass load 447.

Figure 38:
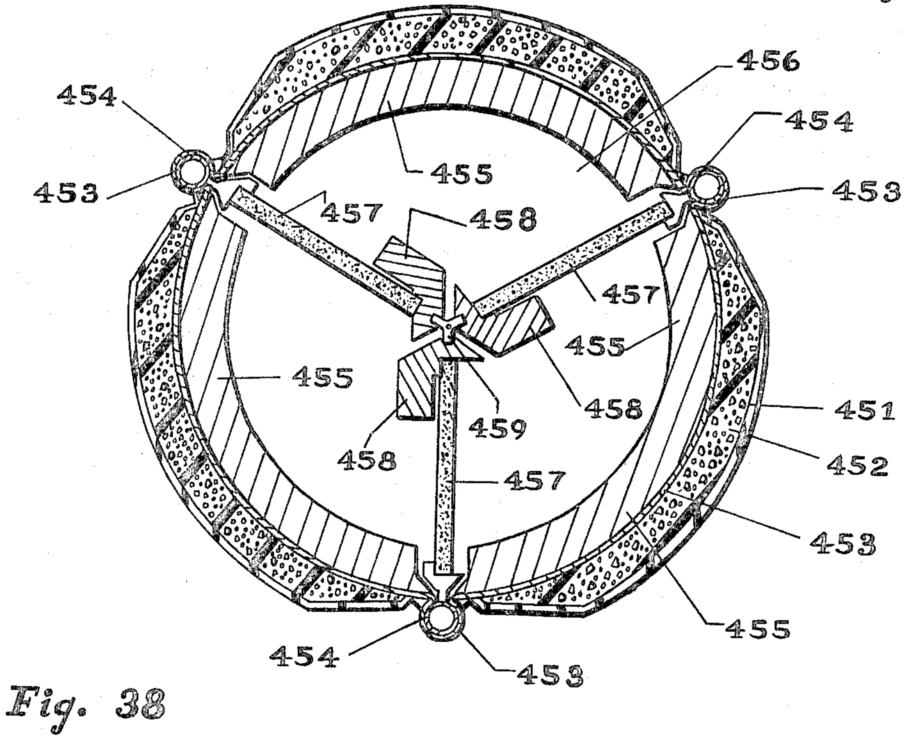
FIG. 38 is a cross section of a deep-submergence transducer assembly having 3 elements and ample space provisions for enclosed circuitry.

Referring now to FIG. 38, there is seen a hydrophone container of a size appropriate for containing ancillary circuitry, thus affording safeguards against the usual entry of noise with cabling and connectors that usually degrade the signal in the high impedance zone beginning with the transducer. The container consists, first, of an outer skin of waterproofing material 451 covering a layer of decoupling material 452, with which the upper and lower surfaces, as well as the sidewall surface of the container, is isolated from ocean-borne sound energy. Next is a very thin metallic skin 453, which is successively wrapped around and bonded to the outer ends of the light-weight but rigid hydrophone levers 454, to which it is bonded by hard, thin adhesive. The portions of skin 453 that are just adjacent to the levers 454 and bridge the minute discontinuities in the 3-segmented wall 455 are nevertheless quite strong enough because of the shortness of their unsupported span portions. The 3-segmented wall 455 is integral with floor 456. Each of the levers 454, projecting inwardly at 120° intervals from the thin skin 453, passes radially via one of the three openings between the ends of the segments 455 of the wall.

The light-weight, stiff levers 454 have cylindrical tips on their outer ends, their inboard ends being stubby. Each lever 454 has, firmly bonded to its inboard end, a thin strip ferroelectric element 457, which may be of any of the flexural types introduced herein or of a bilaminate. Depending on the frequency regime in which it is desired to peak the sensitivity of these elements for a particular application are such important parameters as the length/thickness ratio of elements 457 and the weight of mass loads 458, one of which is carried by each element 457.

All of the hydrophone elements 457 and their mass loads 458 are locked by anti-shock pin 459, which is withdrawn by a solenoid (not seen) at an appropriate time. The fact that anti-shock pin 459 protects elements 457 during storage, shipment, handling, etc., permits the use of very heavy mass loads 458 with respect to the strength of the brittle elements 457; thus maximum sensitivity at low frequencies is made possible.

Figure 39:
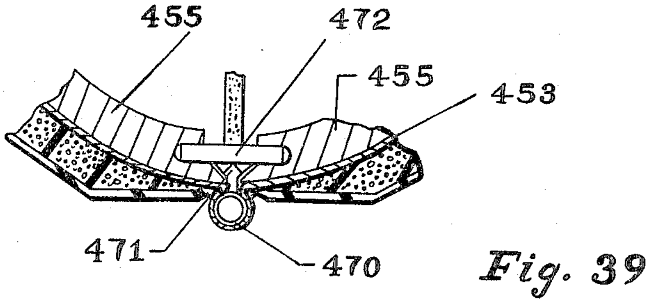
FIG. 39 is a fragmentary cross section of an assembly of the type seen in FIG. 38, but with an alternative lever-support construction.

Referring now to FIG. 39, there is seen an arrangement wherein the thin skin 453 does not carry the bridging load across the wall discontinuities. In FIG. 39, lever 470 has a pair of knife edges projecting both upwardly and downwardly perpendicular to the plane of the paper, only one of which 471 is seen. These extensions may, for example, be jewels or very hard bits of tungsten carbide. The knife edges 471 rest upon insert plate 472, which is preferably also of hard material, stellite for example. This arrangement keeps friction at a minimum and assures maximum responsiveness in element 457.

Figure 40:
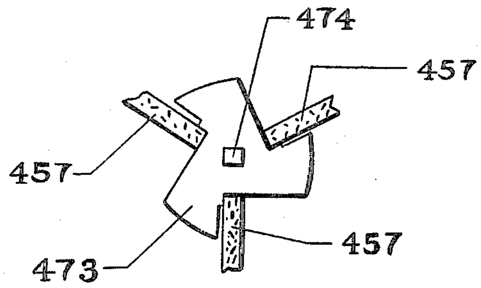
FIG. 40 is a fragmentary cross section of an assembly of the type seen in FIG. 38, but with a common mass load.

Referring now to FIG. 40, another mass-load arrangement is seen, all weights being combined into a single mass load 473, which is locked against imposing shock on elements 457 by square anti-shock pin 474, also disengaged by a solenoid. For maximum responsiveness to low frequencies on the part of elements 457, mass load 473 should be made of very dense materials.

It is obvious that various combinations can be made of the disclosed inventive features without departing from the true scope of this inventive work, such combinations being apparent immediately to those skilled in the art. Obviously also, major improvements over the old art can be realized by the adoption of only portions of the inventive features shown or of readily inferrable equivalents. It is, therefore, intended to include in the claims such portions and equivalents as may fall within the true scope of my inventive work. My inventive work is not to be limited to the specific forms or arrangements to which I have limited my descriptions, drawings, and claims for the sake of brevity and expeditious prosecution. Therefore, I claim:

1. A device for transducing electrical and mechanical energy comprising:
an elongated element fabricated from a ferroelectric ceramic material and having two opposed surfaces of relatively large area,
the thickness of at least a first portion of said element between said surfaces progressively increasing from one end of said first portion,
said element being alternately polarized positively and negatively at transverse sites located at spaced intervals along the length thereof on one of said surfaces; and
a plurality of narrow transverse electrodes respectively contiguously secured to said one surface upon said sites.

2. A device according to claim 1,
wherein one of the said surfaces defines a curve extending along the length of said element.

3. A device as in claim 1, further comprising first and second electrical conductors, and
wherein said electrodes on the positively polarized sites are electrically connected to said first first conductor and electrically opposed to the other electrodes together electrically connected to the second conductor.

4. A device according to claim 3,
wherein the thickness of a second portion of said element between said surfaces increases progressively toward said first portion from an end of said second portion.

5. A device as in claim 4,
wherein said surfaces define respective curves extending along the length of said element,
the ends of said element confronting each other.

6. A device according to claim 4,
wherein one of said surfaces is planar.

7. A device according to claim 4,
wherein the thickness of both of said first and second portions progressively increases at respectively constant rates.

8. A device according to claim 3,
wherein said element is alternately polarized positively and negatively at a plurality of transverse sites located on the other of said surfaces opposite said first-mentioned sites,
the polarities of the sites on the second of said surfaces being respectively the same as the polarities of the opposite sites on said first surface,
said element having additional narrow transverse electrodes contiguously secured upon said second-surface sites,
the electrodes on the negatively polarized sites on said second surface being also electrically connected to said first conductor,
and the electrodes on the positively polarized sites on said second surface being also electrically connected to said second conductor.

9. An array comprising a plurality of transducing devices in accordance with claim 8,
said array having a non-transducing material inclusively bonded between and mutually separating the thick ends of the elements,
said non-transducing material being of greater thickness than the thickness required for constitution of an adhesive film.

10. An array comprising a plurality of transducing devices in accordance with claim 3,
said elements being bonded together at their thick ends.

11. An array comprising a plurality of elements in accordance with claim 3, said elements being integral homotypic arms of a unitary body joined at their thick ends,
said elements extending outwardly at generally equal angular intervals.

12. A device for transducing electrical and mechanical energy comprising:
an elegonated element fabricated from a sintered polycrystalline ferroelectric ceramic material,
and having first and second opposed surfaces of relatively large area,
said element having two halves extending from midlength to the opposite ends thereof,
each half of said element being alternately polarized positively and negatively at transverse sites located at spaced intervals along the length of said surfaces,
the polarities of the sites on the second surface being the same respectively as the polarities of the opposite sites on the first surface; and
a plurality of narrow transverse electrodes respectively contiguously secured to said surfaces upon said sites,
the electrodes on positively polarized sites on the first surface of one half and the second surface of the other half and on negatively polarized sites,
on the second surface of the one half and the first surface of the other half being together connected to one conductor and electrically opposed to the remaining electrodes connected to a second conductor.

13. A device as in claim 12,
wherein the thickness of said element increases in each half between the respective end thereof and midlength.

14. A device for transducing electrical and mechanical energy comprising:
an elongated element fabricated from a ferroelectric ceramic material and having two opposed surfaces of relatively large area; and
an enclosure for said element having a waterproof layer and a decoupling zone,
said decoupling zone containing a gaseous medium characterized by an acoustic impedance well below the range of acoustic impedances of liquids,
said decoupling zone being interposed between said layer of said enclosure and said element except for at least one relatively small energy coupling portion of said element adjacent an end thereof,
said coupling portion projecting outwardly of said zone.

15. A transducing device as in claim 14,
said waterproof outer layer being flexible,
said decoupling zone having a relatively flexible cellular structure,
said enclosure being supported on said opposed surfaces of said element.

16. A transducing device as in claim 15,
said decoupling zone being of sandwich-type construction,
said zone including in general succession outwardly from said surfaces:
an insulating layer;
a layer of hard grid framework capable of withstanding the environmental hydrostatic pressure; and
a layer of hard, thin sheet material capable of bridging said framework under said pressure.

17. A transducing device as in claim 16,
having in said zone a second layer of hard, thin sheet material capable of bridging said framework under said pressure,
said second hard layer being interposed between said insulating layer and said layer of framework.

18. A device as in claim 14,
said energy-coupling portion of said element including at its tip a relatively short non-ferroelectric lever extension bonded firmly to one of said surfaces adjacent said end.

19. An array comprising a plurality of elements as in claim 18,
said elements being bonded firmly to a common central mass at the ends opposite the energy-coupling portions thereof and extending outwardly from said mass at generally evenly arranged intervals angularly.

20. An array as in claim 19,
said enclosure having a rigid exterior wall capable of withstanding environmental hydrostatic pressure,
said medium being enclosed within said wall and surrounding most of said surfaces of said elements,
said elements being supported upon said wall at the ends thereof opposite said mass.

21. An array as in claim 20,
said enclosure having an opening therein for each element and sealing means bridging said opening,
said energy-coupling portions each projecting sealably through a respective opening.

22. A device as in claim 14,
said layer including a rigid exterior wall capable of withstanding hydrostatic pressure without collapse,
said wall being spaced from said element,
said medium being enclosed within said wall and surrounding most of said surfaces of said element,
said enclosure having an opening therein and resilient sealing means bridging said opening,
said sealing means affording a sealed passageway for said coupling portion.

23. A device as in claim 22,
including also means on said wall supporting said element near the end thereof constituting said coupling portion.

24. A device as in claim 23,
said supporting means affording freedom for very slight pivoting motion of said coupling portion.

25. A device as in claim 22,
having a second decoupling zone external to said wall.

26. A device as in claim 22,
the other end of said element being anchored firmly to said wall.

27. A device as in claim 14,
said element having a mass bonded firmly thereto at the end opposite said energy-coupling portion.

28. A laminated decoupling structure for attenuating acoustic-energy transmission between the surface of a transducing element and an environmental fluid comprising:
an insulating inner layer over such surface;
a layer of hard grid framework;
a thin layer of hard material;
and an outer liquid-proofing layer,
said inner layer and outer layer being composed of relatively soft material selected from among elastomers and plastics and constituting relatively plastic force-transmitting media under hydrostatic pressure,
said framework constituting intermittent support means for keeping said layer of hard material separated from direct energy-exchange contact therebeyond,
said layer of hard material constituting continuous bridging means spanning said framework,
whereby the contained open spaces within said framework attenuate energy-transmission components normal to such surface.

29. A decoupling structure as in claim 28,
said structure additionally comprising a second thin layer of hard material,
said second thin layer being interposed between said insulating layer and said layer of framework.

30. A sonar transducing apparatus comprising:
a sealed housing of rigid structure,
said housing having an opening and resilient gasket means sealing said opening;
and a transducing element contained within said housing,
said element having a metallic lever extension portion having principal zones as follows:

a foot zone firmly secured to said element;
a relatively slender zone passing sealably via said gasket means out of said housing;
and a target zone external to said housing.

31. An apparatus as in claim 30,
having also an auxiliary support on said housing,
said support being aligned to react the hydrostatic component of pressure transmitted by said lever extension portion.

References Cited

UNITED STATES PATENTS

| | | | |
|---|---|---|---|
| 2,096,106 | 10/1937 | Guerbilsky | 340—10 X |
| 2,540,194 | 2/1951 | Ellett | 340—10 X |
| 2,812,452 | 11/1957 | Harris | 340—10 X |

RODNEY D. BENNETT, *Primary Examiner.*

B. L. RIBANDO, *Assistant Examiner.*